(12) United States Patent
Nevoigt et al.

(10) Patent No.: US 7,451,860 B2
(45) Date of Patent: Nov. 18, 2008

(54) SHOCK ABSORBER WITH AMPLITUDE DAMPING

(75) Inventors: Andreas Nevoigt, Hagen (DE); Steffen Lang, Ennepetal (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 49 days.

(21) Appl. No.: 11/107,691

(22) Filed: Apr. 15, 2005

(65) Prior Publication Data

US 2005/0230202 A1   Oct. 20, 2005

(30) Foreign Application Priority Data

Apr. 20, 2004   (DE) .................. 10 2004 018 990

(51) Int. Cl.
*F16F 9/00* (2006.01)

(52) U.S. Cl. .................. 188/322.22; 188/280

(58) Field of Classification Search ............ 188/322.22, 188/321.11, 322.17, 280, 275, 298, 314
See application file for complete search history.

(56) References Cited

U.S. PATENT DOCUMENTS

| | | | | | |
|---|---|---|---|---|---|
| 3,232,390 | A | * | 2/1966 | Chano ..................... | 188/280 |
| 3,367,455 | A | * | 2/1968 | Panigati ................. | 188/322.13 |
| 3,896,908 | A | * | 7/1975 | Petrak ..................... | 188/280 |
| 4,765,446 | A | * | 8/1988 | Murata et al. ............ | 188/282.4 |
| 4,893,980 | A | * | 1/1990 | Balter ..................... | 414/3 |
| 5,226,512 | A | * | 7/1993 | Kanari .................... | 188/282.2 |
| 5,248,014 | A | * | 9/1993 | Ashiba .................... | 188/282.8 |
| 5,339,932 | A | * | 8/1994 | Lanterman ............... | 188/316 |
| 5,386,892 | A | * | 2/1995 | Ashiba .................... | 188/282.8 |
| 6,039,159 | A | * | 3/2000 | Ohlin et al. .............. | 188/322.15 |
| 6,220,409 | B1 | * | 4/2001 | Deferme ................. | 188/322.15 |
| 6,561,326 | B2 | * | 5/2003 | Gotz ....................... | 188/322.15 |
| 7,100,750 | B2 | * | 9/2006 | Drees ..................... | 188/322.15 |
| 7,255,211 | B2 | * | 8/2007 | Gotz et al. .............. | 188/322.22 |
| 2002/0108886 | A1 | * | 8/2002 | Kim ........................ | 206/586 |

FOREIGN PATENT DOCUMENTS

| | | | |
|---|---|---|---|
| AT | 219435 | * | 1/1962 |
| DE | 4002882 C1 | * | 2/1991 |
| DE | 19948800 A1 | * | 5/2001 |
| FR | 2070461 | * | 9/1971 |
| FR | 2425585 A1 | * | 12/1979 |
| FR | 2796689 A1 | * | 1/2001 |
| GB | 809682 | * | 3/1959 |

* cited by examiner

*Primary Examiner*—Robert A. Siconolfi
*Assistant Examiner*—Vu Q Nguyen
(74) *Attorney, Agent, or Firm*—Crowell & Moring LLP

(57) ABSTRACT

For a device for the amplitude-dependent absorption of shocks, especially of the wheel of a vehicle, with at least one working piston (3), which is disposed within an absorbing housing (1) and connected with a piston rod (2) and divides the absorbing housing (1) into two absorbing spaces (4, 5) and interacts with a hydraulic element, which is disposed in parallel for affecting small amplitudes and has a space (15) with a dividing element, the space (15) being tied in with hydraulic tie-ins with the absorbing spaces (4, 5), the greatest possible absence of wear and a soft response of the working piston are to be achieved. For this purpose, it is proposed that the dividing element consists of a foamed, elastic material.

24 Claims, 4 Drawing Sheets

SHOCK ABSORBER WITH AMPLITUDE DAMPING

The invention relates to a device for the amplitude-dependent absorption of shocks, especially of the wheel of a vehicle of the introductory portion of claim 1.

As a rule, the magnitude of the absorption can be affected only by the resistances of the flow channels. On the other hand, a smaller absorption force would be desirable for small amplitudes and correspondingly higher absorption forces would be desirable for longer piston strokes.

The EP 1 152 155 A1 shows a shook absorber for wheels of a vehicle, which works together with an element for influencing small amplitudes of a vehicle wheel. Small amplitudes are affected by a membrane or a displaceable, fixed disk, which divides a separate space, this space being connected with the upper and/or the lower absorption space.

It is a disadvantage of this construction that pressure surges occur when the membrane or the fixed disk strikes against the bottom of the separate space. This leads to a rapid wear of the membrane or disk and, in extreme cases, can be disadvantageously noticeable even for the driver.

SUMMARY OF THE INVENTION

It is an object of the invention to eliminate the above-described disadvantages and to create a device for the amplitude-dependent absorption of shocks, which is as free of wear as possible and enables a soft response of the working piston.

This objective is accomplished by the distinguishing features of claim 1. Advantageous constructions and further developments are given in claims 2 to 14.

Due to the inventive solution, which consists therein that the dividing element consists of a foamed, elastic material, the dividing element no longer strikes against one of the bottoms of the additional space. The space preferably is filled completely with the foamed, elastic material. As a result, the material lies in contact with all regions of the space from the very start. In the case of a one-sided overpressure, produced by small amplitudes, the foamed material is compressed only on one side. In the case of small amplitudes, however, these compressions are equalized out once again directly. Due to the relatively soft structure of the foamed material, the contacting after decompression has taken place is also very soft, the foamed material contacting the space to be filled in a rolling manner. Furthermore, advantageously, the desired absorption effect can be affected by the choice of foamed material without having to change the configuration of the space accommodating the foamed material. The adaptation of the material can be affected, on the one hand, by the choice of material, which is formed open pored or closed pored. On the other, there is much latitude with regard to selecting the compressibility in view of the desired properties of the inserted foam.

BRIEF DESCRIPTION OF THE DRAWINGS

The object of the invention is described in greater detail in the following by means of an example and shown in the drawing, in which.

DETAILED DESCRIPTION OF THE INVENTION

Figure 1:
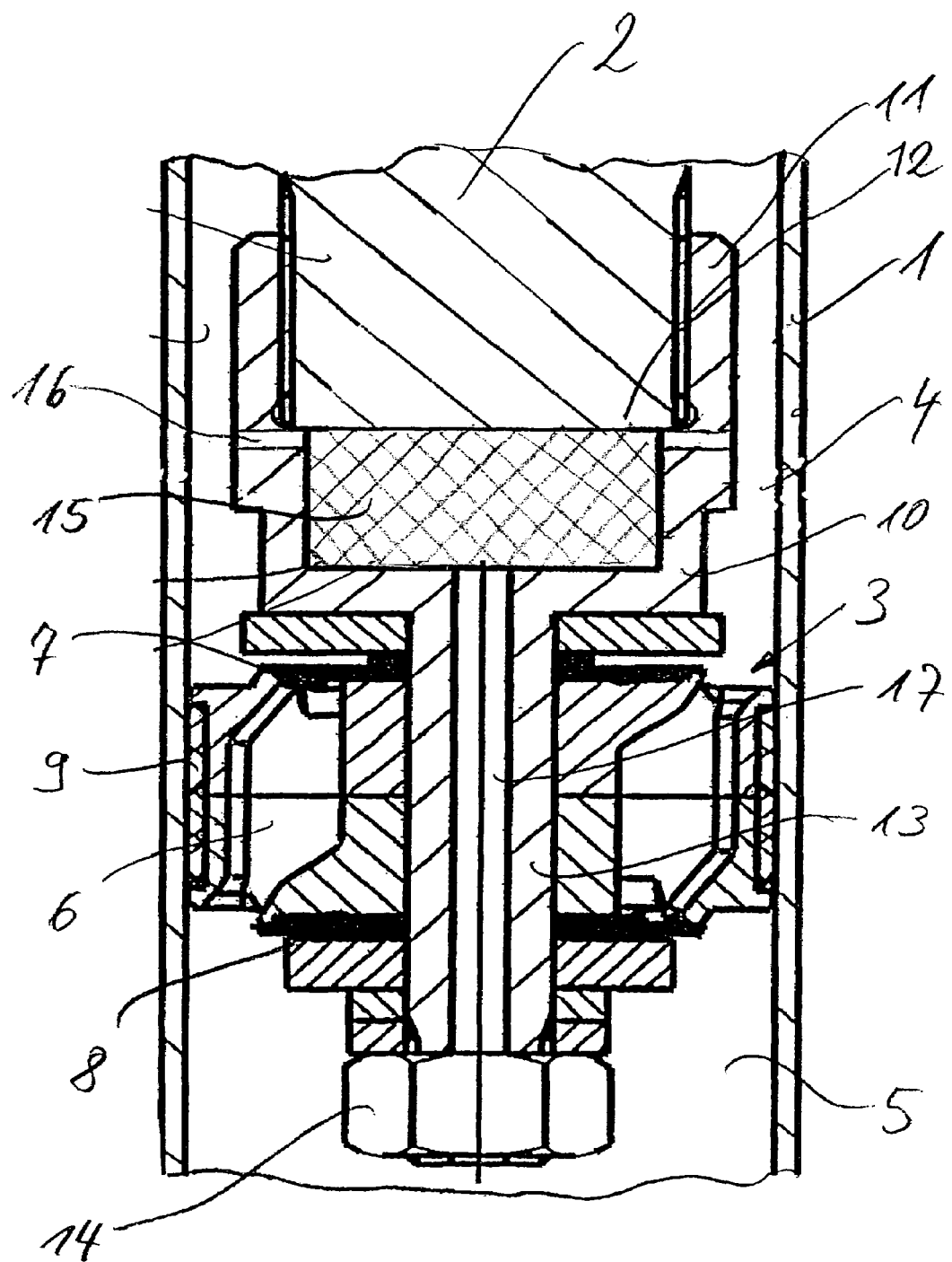
FIG. 1 shows a section through the shock absorber in the region of the working piston, the equalizing element for affecting small amplitudes being disposed between the working piston and the end of the piston rod.

In both Figures, a single-tube shock absorber is shown. However the invention is also suitable similarly for 2-tube shock absorbers.

As shown diagrammatically in the two Figures, the shock absorber has an absorber housing 1, which is constructed closed off at one end and has an opening at the other, through which a piston rod 2, to the end of which a working piston 3 is connected, dips in and out in an oscillating fashion.

The working piston 3 divides the space of the absorbing housing, which is filled with absorbing fluid, into two absorbing spaces 4, 5.

The working piston 3 has openings 6, which are covered, in each case, on one side by means of valve plates 7, 8. Due to this construction, the openings 6 and the valve plates 7, 8 function in each case unilaterally as a check valve. As the piston rod 2 moves in the tension direction, that is, upwards in the Figures, the absorbing fluid is displaced from the upper absorbing space 4 and flows through the associated opening 6, the valve plates 8 being raised from their seat. As the piston rod 2 moves downward, that is, in the compression direction, there is flow through the associated opening 6 from the lower absorbing space 5 into the upper absorbing space 4, the valve plates 7 being raised. A seal 9 is provided around the working piston 3 in order to seal it from the absorber housing 1.

In the case of the inventive absorber, the above-described absorbing process takes place only for large movement amplitudes of the piston rod 2 and, with that, of the working piston 3. Movements of smaller amplitude are compensated for by an element, which is described below, without flow of the working piston 3 through the openings 6.

In accordance with FIG. 1, this element is constructed as described below. The element has a housing 10, which terminates at its upper end in a threaded ring 11, which is bolted to the end 12 of the piston rod 2, which is provided with a thread. The other end of the housing 10 is constructed with a neck 13, to which the working piston 3 is fastened by means of a bolted connection having a nut 14. Other types of fastening between the housing 10 and the piston rod 2, such as welding, soldering or gluing, can be used, if such use is appropriate in the opinion of someone skilled in the art.

Within its housing 10, the element has a space 15, which is filled with a foamed, elastic material. Hydraulic tie-ins, which terminate in each case above or below the material disposed in the space 15, connect the space 15 with the respective absorbing spaces 4, 5. In FIG. 1, the hydraulic connections are transverse boreholes 16 through the housing 10 as well as a central longitudinal borehole 17 through the neck 13.

When there is a slight pressure difference between the absorbing spaces 4 and 5, the material in space 15 is compressed in each case on one side. If the material is open pored, the absorbing fluid can also flow through it to a slight extent. However, this is, if anything, more of a theoretical nature, since the working piston 3 assumes its absorbing activity as the pressure difference becomes greater.

Figure 2:
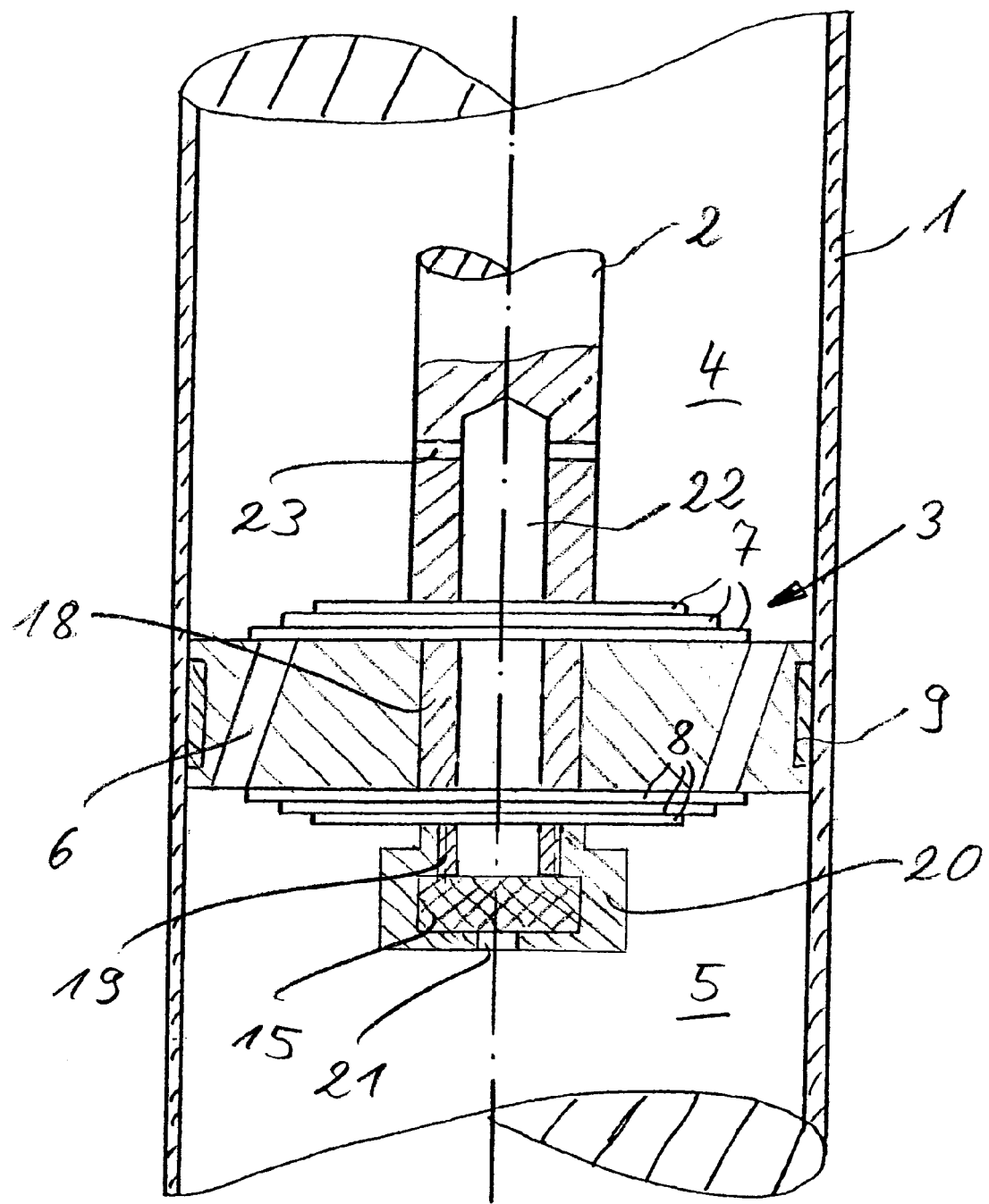
FIG. 2 shows a section similar to that of FIG. 1, for which the equalizing element is disposed below the working piston.

In FIG. 2, a different type of construction of the absorbing element for affecting small amplitudes is shown. For this construction, the piston rod 2 is constructed with a neck 18 at the end 12 of the piston rod 2, to which the working piston 3 is attached. A threaded end 19, which is provided with an external thread, protrudes downward beyond the working piston 3. The element is constructed here as a fastening nut 20 for fastening the working piston 3 to the end 12 of the piston rod 2. The fastening nut 20 is constructed with a central space 15 for accommodating the foamed, elastic material. As hydraulic tie-in to the lower absorbing space 5, this space 15 has a borehole 21. The hydraulic tie-in to the upper absorbing space 4 is brought about by a central borehole 22 through the piston rod 2, which is then connected over transverse boreholes 23 hydraulically with the upper absorbing space 4.

The absorbing element, described in FIG. 2, acts in the same way as the absorbing element described above in connection with FIG. 1.

Figure 3:
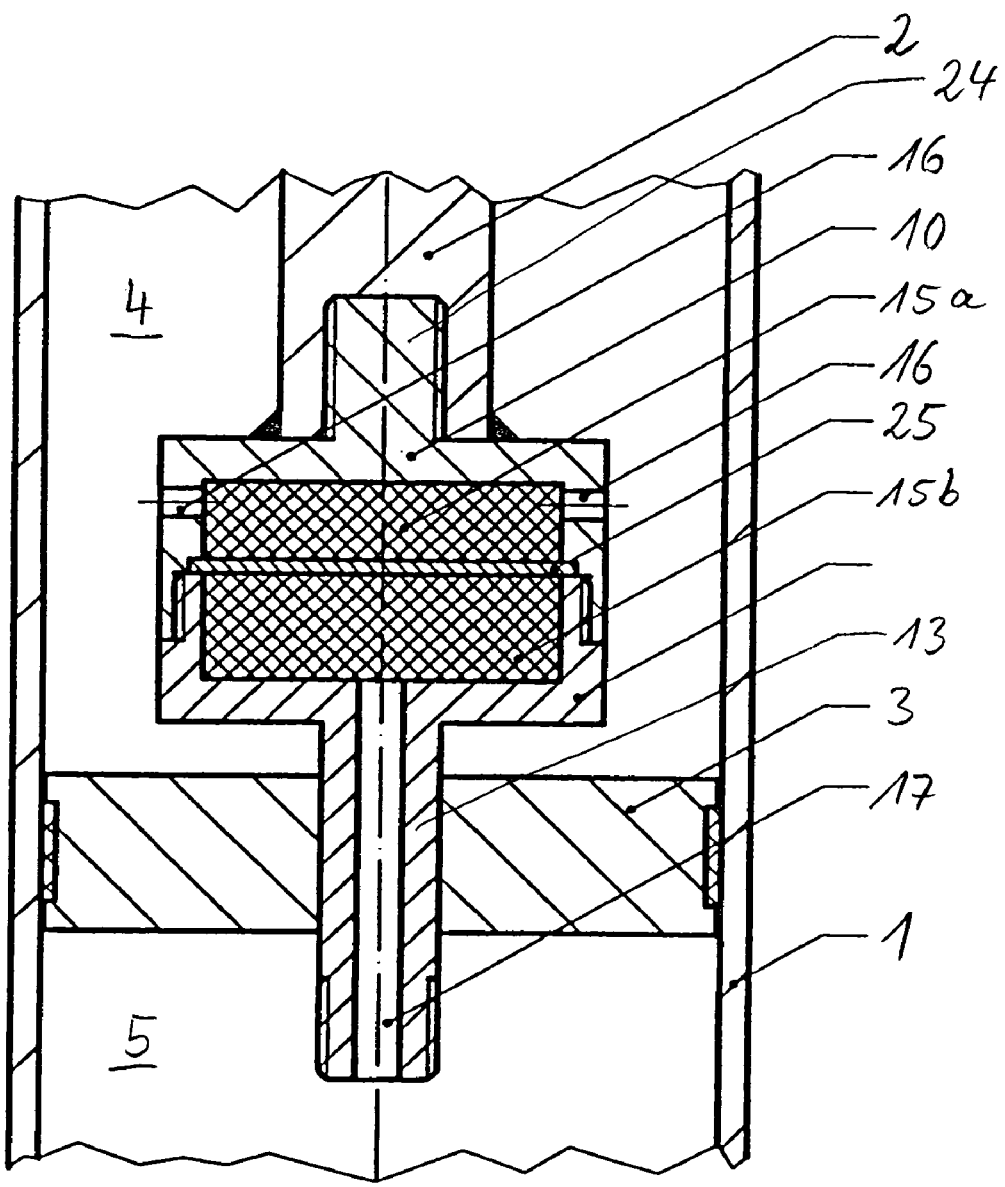
FIG. 3 shows a section through a shock absorber, for which two equalizing elements, which are separated from one another, are disposed in separate partial spaces

FIG. 3 shows an embodiment of the invention, for which the housing 10, which encloses the space 15, is constructed in two parts. A first part of the housing has a threaded neck 24, which is bolted together with the end 12 of the piston rod 2. At the end opposite to this threaded neck 24, the first part of the housing has an internal thread, which is bolted together with a corresponding external thread of a second part of the housing. At its lower end, the second part of the housing has a neck 13, to which the working piston 3 is fastened. A solid dividing disk 25 is disposed between the halves of the housing, between which it is held firmly clamped. This dividing disk divides the space 15 into two partial spaces 15a and 15b, each partial space accommodating a separate dividing element. By means of such an arrangement, it is achieved that the dividing element, which is the upper one in FIG. 3, interacts exclusively with the absorbing space 4, whereas the lower dividing element interacts only with the absorbing space 5. The dividing elements of both partial spaces are each supported on the solid dividing disk 25. The upper partial space 15a, shown in FIG. 3, is tied in hydraulically with the absorbing space 4 over the transverse boreholes 16. The lower partial space 15b, shown in FIG. 3, is tied in hydraulically over a longitudinal borehole 17, which extends through the neck 13, with the absorbing space 5.

When the shock absorbers rebound, the pressure is passed on over the transverse boreholes 16 to the compressible element in the partial space 15a. The other compressible element remains unaffected. In the reverse movement, the other elastomer in the partial space 15b is acted upon through the longitudinal borehole 17 and the elastomer in the partial space 15a remains unaffected. For such an arrangement, different materials can be used for the separate dividing elements. This is advantageous especially for single-tube absorbers, for example, because the requirements, which are to be met by the dividing element interacting with the pressure stage, can fluctuate greatly depending on whether the single-tube absorber is or is not equipped with a bottom valve. In general, the separate arrangement of dividing elements in the individual partial spaces 15a, 15b offers the possibility of adapting the properties of the dividing elements to the requirements of the respective absorbing tasks.

Figure 4:
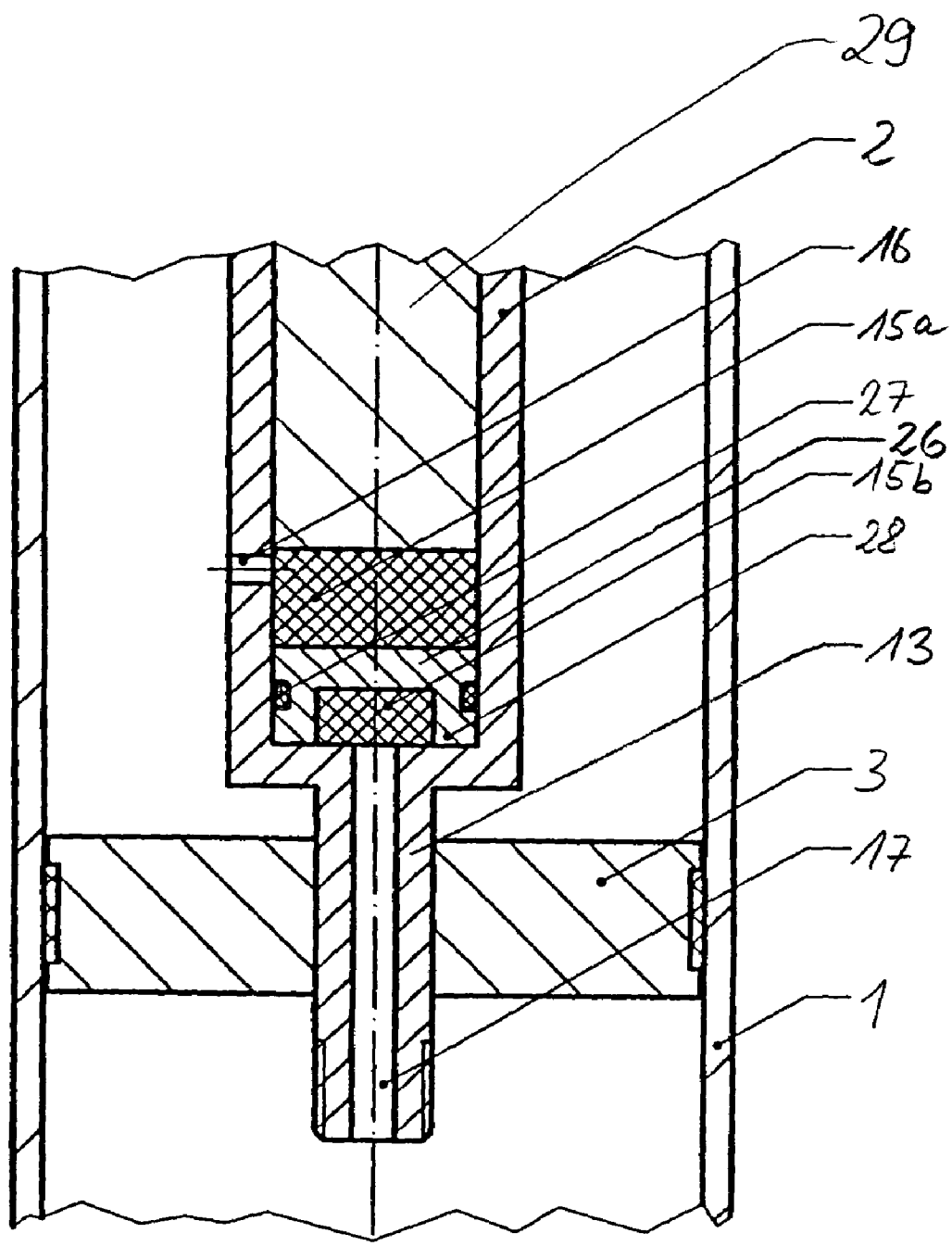
FIG. 4 shows an embodiment of the invention, which is a modified version of that of FIG. 3.

An embodiment of the invention, which is similar to the embodiment shown in FIG. 3, is represented in FIG. 4. Contrary to FIG. 3, the space 15, accommodating the dividing element in FIG. 4, is disposed in the interior of the piston rod. At the end of the piston rod, a neck 13 is provided, to which the working piston 3 is fastened.

A pot-shaped element 26, that is, an element, which has a disk-shaped bottom and a hollow cylindrical shoulder 28, is provided as dividing disk for the embodiment of FIG. 4. In the case of the installed position, shown in FIG. 4, this pot-shaped element 26 is pressed in to the interior space of the piston rod 2, so that this element is held axially stationary in the piston rod by a press fit. Sealing of the absorption spaces 4, 5 is ensured by an O-ring 27, which is inserted into an appropriate groove in the pot-shaped element.

An insert 29, which supports the dividing element disposed in the partial space 15a, is inserted in the hollow piston rod 2. Accordingly, the space 15 is enclosed by the insert 29 as well as the inner walls of the hollow piston rod 2. The space 15 once again is divided into two partial spaces 15a, 15b by the pot-shaped element 26. The partial space 15a, which is the upper partial space in FIG. 4, accommodates a first dividing element and is operatively connected over a transverse borehole 16 with the absorbing space 4. On the other hand, the partial space 15b, which is the lower partial space in FIG. 4, is operatively connected over the longitudinal borehole 17, which extends through the neck 13, with the absorbing space 5. The dividing element, which is disposed in the partial space 15b, is supported axially by the pot-shaped element 26, which is held axially stationary, and by the inner wall of the piston rod 2. The dividing element, disposed in the partial space 15a, is supported in the axial direction by the insert 29 and the pot-shaped element 26, which is held stationary axially.

It is obvious to someone skilled in the art that the pot-shaped element 26 can be fixed to be stationary in the interior of the piston rod in various ways. The possibility, named above, of pressing the pot-shaped element over a press fit into the piston rod is only one possibility for fixing this element locally. It is equally possible to achieve the local fixation of this element, for example, by retaining rings or by gluing.

The mode of functioning of the embodiment of the invention, shown in FIG. 4, corresponds to that described in connection with FIG. 3 above.

LIST OF REFERENCES SYMBOLS

1. Absorber housing
2. Piston rod
3. Working piston
4. Absorbing space
5. Absorbing space
6. Opening
7. Valve disk
8. Valve disk
9. Seal
10. Housing
11. Threaded ring
12. End
13. Neck
14. Nut
15. Space
15a. Partial space
15b. Partial space
16. Transverse boreholes
17. Longitudinal borehole
18. Neck
19. Threaded end
20. Fastening nut
21. Borehole
22. Borehole
23. Transverse borehole
24. Threaded neck
25. Dividing disk
26. Pot-shaped element
27. O-ring
28. Shoulder
29. Insert

The invention claimed is:

1. A device for amplitude-dependent absorption of shocks of a wheel of a vehicle, said device comprising:
   at least one working piston within an absorbing housing;
   a piston rod connected to said piston, said piston dividing said absorbing housing into two absorbing spaces; and
   a hydraulic element interacting with said piston in parallel for affecting small amplitudes; wherein,
   said hydraulic element has a space with a dividing element, said space being associated via hydraulic means with said absorbing spaces;
   said dividing element comprises foamed elastic material, and fills said space substantially completely when not in a compressed state or slightly compressed state;
   elastic deformation of said foamed elastic material produces damping of vibrations with small amplitudes;
   said space is divided into two partial spaces by a solid dividing disk, with a separate dividing element in each of said partial spaces;
   one of said partial spaces is connected with an upper one of said absorbing spaces;
   the other of said partial spaces is connected with a lower one of said absorbing spaces; and
   said dividing disk is immovable in an axial direction of said piston rod.

2. The device as defined in claim 1, wherein said dividing element comprises foamed plastic or foamed rubber.

3. The device as defined in claim 1, wherein said dividing element comprises open pore foamed material.

4. The device as defined in claim 1, wherein said dividing element comprises a closed pore foamed material.

5. The device as defined in claim 1, wherein said foamed elastic material of said dividing element is selected so that said absorbing spaces are separated oil-tight from one another.

6. The device as defined in claim 1, wherein said space is within an element in a lower one of said absorbing spaces.

7. The device as defined in claim 1, further comprising a fastening nut which interacts with said working piston and pretensions valve discs.

8. The device as defined in claim 1, wherein said space is within an element in an upper one of said absorbing spaces.

9. The device as defined in claim 8, wherein said element in an upper one of said absorbing spaces is located between an end of said piston rod and said working piston.

10. The device as defined in claim 8, wherein said element in an upper one of said absorbing spaces has an end with a neck carrying said working piston.

11. The device as defined in claim 8, wherein said space is a cavity in said piston rod.

12. The device as defined in claim 1, wherein the dividing elements in said two partial spaces comprise different materials which are adapted to absorption requirements of the respective absorbing space.

13. A device for amplitude-dependent absorption of shocks of a wheel of a vehicle, said device comprising:
   at least one working piston within an absorbing housing;
   a piston rod connected to said piston, said piston dividing said absorbing housing into two absorbing spaces; and
   hydraulic element interacting with said piston in parallel for affecting small amplitudes; wherein
   said hydraulic element has a space with a dividing element, said space being associated via hydraulic means with said absorbing spaces;
   said dividing element comprises foamed elastic material, and fills said space substantially completely when not in a compressed state or slightly compressed state;
   elastic deformation of said foamed elastic material produces damping of vibrations with small amplitudes;
   said space is divided into two partial spaces by an element of circular cross-section inserted axially stationary in a cavity of said piston rod;
   each partial space has a separate dividing element; and
   hydraulic means are provided for connecting one partial space to one of said absorbing spaces and for connecting the other partial space to the other one of said absorbing spaces; and
   said element of circular cross-section is immovable in an axial direction of said piston rod.

14. The device as defined in claim 13, wherein said dividing element comprises foamed plastic or foamed rubber.

15. The device as defined in claim 13, wherein said dividing element comprises open pore foamed material.

16. The device as defined in claim 13, wherein said dividing element comprises a closed pore foamed material.

17. The device as defined in claim 13, wherein said foamed elastic material of said dividing element is selected so that said absorbing spaces are separated oil-tight from one another.

18. The device as defined in claim 13, wherein said space is within an element in a lower one of said absorbing spaces.

19. The device as defined in claim 13, further comprising a fastening nut which interacts with said working piston and pretensions valve discs.

20. The device as defined in claim 13, wherein said space is within an element in an upper one of said absorbing spaces.

21. The device as defined in claim 20, wherein said element in an upper one of said absorbing spaces is located between an end of said piston rod and said working piston.

22. The device as defined in claim 20, wherein said element in an upper one of said absorbing spaces has an end with a neck carrying said working piston.

23. The device as defined in claim 20, wherein said space is a cavity in said piston rod.

24. The device as defined in claim 13, wherein the dividing elements in said two partial spaces comprise different materials which are adapted to absorption requirements of the respective absorbing space.

* * * * *